United States Patent [19]

Beardsley et al.

[11] Patent Number: 5,771,367

[45] Date of Patent: Jun. 23, 1998

[54] STORAGE CONTROLLER AND METHOD FOR IMPROVED FAILURE RECOVERY USING CROSS-COUPLED CACHE MEMORIES AND NONVOLATILE STORES

[75] Inventors: Brent Cameron Beardsley; Lawrence Carter Blount; Gail Andrea Spear; Vern John Legvold, all of Tucson, Ariz.

[73] Assignee: International Business Machines Corporation, Armonk, N.Y.

[21] Appl. No.: 550,184

[22] Filed: Oct. 30, 1995

Related U.S. Application Data

[63] Continuation of Ser. No. 991,812, Dec. 17, 1992, abandoned.

[51] Int. Cl.[6] .............................. G06F 12/16; G06F 13/00; G06F 11/08
[52] U.S. Cl. .......................... 395/489; 395/440; 395/446; 395/182.03; 395/182.04
[58] Field of Search .................................... 395/488, 489, 395/445, 446, 447, 451, 457, 439, 440, 441, 182.04, 182.05, 182.03, 183.18

[56] References Cited

U.S. PATENT DOCUMENTS

| | | | |
|---|---|---|---|
| 4,207,609 | 6/1980 | Luiz et al. | 395/858 |
| 4,467,414 | 8/1984 | Akagi et al. | 395/250 |
| 4,667,288 | 5/1987 | Keeley et al. | 395/183.01 |
| 4,686,621 | 8/1987 | Keeley et al. | 395/183.16 |
| 4,860,333 | 8/1989 | Bitzinger et al. | 379/10 |
| 4,916,605 | 4/1990 | Beardsley et al. | 395/489 |
| 4,920,479 | 4/1990 | Hashiguchi | 395/181 |
| 4,958,273 | 9/1990 | Anderson et al. | 395/800 |
| 5,019,971 | 5/1991 | Lefsky et al. | 395/250 |
| 5,051,887 | 9/1991 | Berger et al. | 395/489 |
| 5,119,488 | 6/1992 | Takamatsu | 395/182.02 |
| 5,123,099 | 6/1992 | Shibata et al. | 395/447 |
| 5,134,584 | 7/1992 | Boles et al. | 365/200 |
| 5,134,712 | 7/1992 | Yamamoto | 395/800 |
| 5,148,540 | 9/1992 | Beardsley et al. | 395/182.03 |
| 5,394,532 | 2/1995 | Belsan | 395/441 |
| 5,404,487 | 4/1995 | Murata et al. | 395/441 |
| 5,437,022 | 7/1995 | Beardsley et al. | 395/488 |

*Primary Examiner*—Glenn Gossage
*Attorney, Agent, or Firm*—Benman, Collins & Sawyer

[57] ABSTRACT

An improved storage controller and method for storing and recovering data. The storage controller includes a first cluster for directing data from a host computer to a storage device and a second cluster for directing data from a host computer to a storage device. A first cache memory is connected to the first cluster and a second cache memory is connected to the second cluster. A first nonvolatile memory is connected to the second cluster and a second nonvolatile memory is connected to the first cluster. The first and second cache memories and the first and second nonvolatile stores are thus "cross-coupled" to the first and second clusters to provide improved data recovery capability. Data is directed to the first cache and backed up to the first nonvolatile memory in a first operational mode. In the event of failure of the first nonvolatile memory, data is recovered from the first cache memory. In a particular embodiment, in the event of failure of the first nonvolatile memory, data is directed from the first cache memory to the second cache memory. The cache memories and nonvolatile stores may also be formed on separate power boundaries. By allowing for use of the first cache after failure of an associated nonvolatile memory, a system and technique for mitigating performance degradation in a storage control unit due to a failure in nonvolatile memory associated therewith may be obtained.

9 Claims, 6 Drawing Sheets

STORAGE CONTROLLER AND METHOD FOR IMPROVED FAILURE RECOVERY USING CROSS-COUPLED CACHE MEMORIES AND NONVOLATILE STORES

This is a Continuation of application Ser. No. 07/991,812 filed Dec. 17, 1992, now abandoned.

BACKGROUND OF THE INVENTION

1. Field of the Invention

The present invention relates to computing systems. More specifically, the present invention relates to systems for increasing the fault tolerance of computing systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

In large distributed computing systems, a plurality of host computers are typically connected to a number of direct access storage devices (DASDs), such as a tape or disk drive unit, by a storage controller. Among other functions, the storage controller handles connection and disconnection between a particular computer and a DASD for transfer of a data record. In addition, the storage controller stores data in electronic memory for faster input and output operations.

The International Business Machines (IBM) Corporation (Armonk, N.Y.) Model 3990 storage controller, is an example of a storage controller which controls connections between magnetic disk units and host computers. The host computers are typically main frame systems such as the International Business Machines 3090, the Model ES9000, or other comparable systems.

The International Business Machines 3990 Model 3 type controller can handle up to sixteen channels from host computers and up to sixty-four magnetic storage units. The host computers are connected to the storage controller by at least one and by up to four channels. The storage controller typically has two storage clusters, each of which provides for selective connection between a host computer and a direct access storage device and each cluster being on a separate power boundary. The first cluster might include a multipath storage director with first and second storage paths, a shared control array (SCA) and a cache memory. The second cluster typically includes a second multipath storage director with first and second storage paths, a shared control array and a non-volatile store (NVS).

Thus, each storage path in the storage controller has access to three addressable memory devices used for supporting storage controller operation: the cache; the nonvolatile store; and the shared control array. The three memory devices and asynchronous work elements (AWEs) comprise the shared structures of the 3990 control unit.

Cache is best known for its application as an adjunct to computer memory where it is used as a high speed storage for frequently accessed instructions and data. The length of time since last use of a record is used as an indicator of frequency of use. Cache is distinguished from system memory in that its contents are aged from the point of time of last use. In a computer memory address space, program data has to be released before data competing for space in the address space gains access. In cache, competition for space results in data falling out of the cache when they become the least recently used data. While infrequently accessed data periodically enter cache, they will tend to "age" and fall out of cache. Modified data in cache is duplicated in nonvolatile memory. Storage controller cache performs an analogous function for direct access storage devices and storage controllers. Reading data from (and writing data to) the magnetic media of the direct access storage devices is fairly time consuming. Among the factors slowing the read and write operations are time required for the magnetic disk to bring a record location into alignment with a transducer and the limited bandwidth of the magnetic transducer used to read and write the data. By duplicating frequently accessed data in cache, read time for data is reduced and data storage system throughput is considerably enhanced.

Nonvolatile storage (NVS) serves as a backup to the cache for the buffering function. Access to NVS is faster than access to a direct access storage device, but generally slower than cache. Data are branched to cache and to NVS to back up the cache in case of power failure. Data written to NVS have been treated as being as safe as if written to magnetic media. Upon staging of a data record to NVS an indication is given to the host computer that the data are successfully stored. The NVS is required for Fast Write operations and to establish Dual Copy pairs. If cache is made unavailable, all Fast Write data will be destaged during "make unavailable" process and no new Fast Write data will be written to the NVS until cache is made available. When cache is unavailable, the NVS is still required to maintain the bit maps defining the cylinders that are out-of-sync between the primary and secondary devices for Dual Copy.

A shared control array (SCA) is a memory array which is shared over all storage paths. There are typically two types of data in the SCA. The first is data to support the DASD and the second is the data to support the caching and extended functions (i.e. Fast Write and Dual Copy).

The conventional storage control unit is typically designed so that no single point of failure in the unit will cause a failure of the entire system. The failure of certain components, however, can cause a degradation in performance of the control unit. A failure in cache, for example, typically results in such a performance degradation. Unfortunately, host systems have become tuned and therefore so reliant on the speed afforded by a fully functional cache, that the performance degradation associated with a failure in cache has the same effect as a single point failure.

The need in the art for a system and technique for mitigating performance degradation in a storage control unit associated with a failure in cache memory associated therewith is addressed by the invention of copending application entitled "STORAGE CONTROLLER HAVING ADDITIONAL CACHE MEMORY AND A MEANS FOR RECOVERING FROM FAILURE AND RECONFIGURING A CONTROL UNIT THEREOF IN RESPONSE THERETO", Ser. No. 07/993,248, filed Dec. 17, 1992 by B. C. Beardsley et al., now U.S. Pat. No. 5,437,022, the teachings of which are incorporated herein by reference. The invention provides a storage controller with two cache memories, two nonvolatile storage buffers. Each NVS memory backs up a cache memory across a power boundary. The storage controller also includes microcode for recovering from failure and reconfiguring the control unit thereof in response thereto. When DASD Fast Write is performed, the write data is transferred into the cache and NVS at the same time. The system is designed to provide continuous availability to extended function operations (e.g., DASD Fast Write and Dual Copy) even when a failure of cache or NVS occurs. (DASD Fast Write (DFW) is an operation in which data to be written to the storage device is written to cache and backed up in nonvolatile memory. Dual Copy involves a designation of and preservation of data for later backup to a storage device.)

However, when an NVS fails, its partner cache can no longer accept DASD Fast Write requests. If a DFW request is made to that cache, it must perform the write to the drive. This slows and therefore adversely impacts the performance of the system.

The prior solution of simply making that cache unavailable for use solves the DASD Fast Write problem, but it creates another performance problem by cutting the amount of cache available in half.

Thus, a need remains in the art for a system and technique for mitigating performance degradation in a storage control unit due to a failure in nonvolatile memory.

SUMMARY OF THE INVENTION

The need in the art is addressed by the storage controller of the present invention. The inventive controller includes a first cluster for directing data from a host computer to a storage device and a second cluster for directing data from a host computer to a storage device. A first cache memory is connected to the first cluster and a second cache memory is connected to the second cluster. A first nonvolatile memory is connected to the second cluster and a second nonvolatile memory is connected to the first cluster. Data is directed to the first cache and backed up to the first nonvolatile memory in a first operational mode. In the event of failure of the first nonvolatile memory, data is recovered from the first cache memory. In a particular embodiment, in the event of failure of the first nonvolatile memory, data is directed from the first cache memory to the second cache memory.

By allowing for use of the cross-paired cache after failure of an associated nonvolatile memory, the invention addresses the need in the art for a system and technique for mitigating performance degradation in a storage control unit due to a failure in nonvolatile memory associated therewith.

DESCRIPTION OF THE INVENTION

Illustrative embodiments and exemplary applications will now be described with reference to the accompanying drawings to disclose the advantageous teachings of the present invention.

Figure 1:
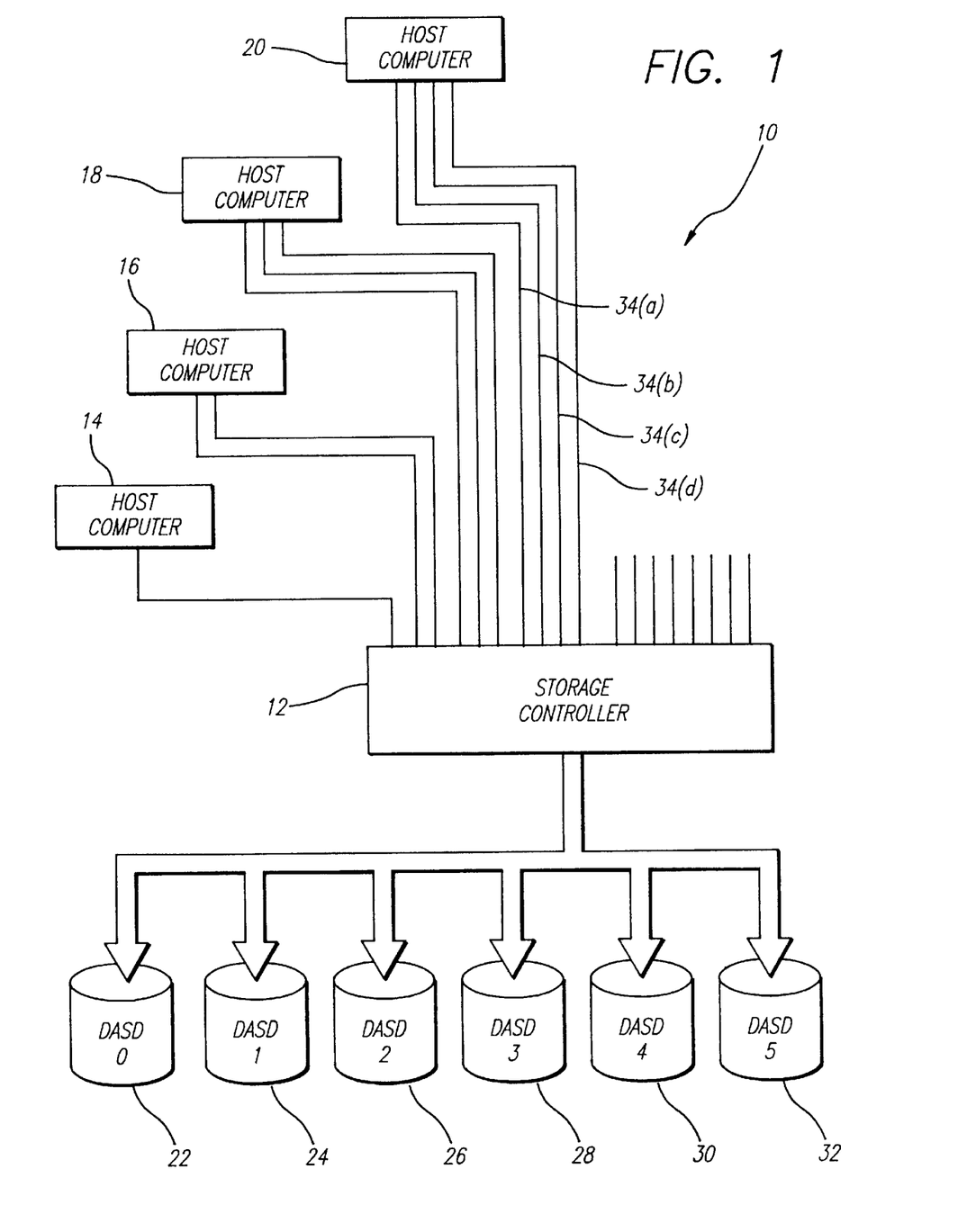
FIG. 1 is a high level block diagram of a data processing system.

FIG. 1 is a high level block diagram of a data processing system 10. The system 10 includes a storage controller 12, a plurality of host computers 14, 16, 18 and 20 and a plurality of direct access storage devices (DASD) 22–32. Presently, disk drive units are the most common type of DASD. In large multiple computer data processing systems, a large number of direct access storage devices serve several computers.

The storage controller 12 is logically positioned between the host computers 14–20 and the DASDs 22–32. The storage controller 12 handles connection and disconnection between a particular computer and magnetic disk unit for transfer of a data record.

The IBM Model 3990 storage controller, is an example of a storage controller used to control connections between magnetic disk units and host computers. The host computers 14–20 are typically main frame systems such as the IBM 3090, the Model ES9000, or other comparable systems.

The IBM 3990 Model 3 type controller can handle up to sixteen channels from host computers and up to sixty-four magnetic storage units. Hence, the host computers 14–20 are connected to storage controller 12 by at least one and by up to four channels. For example, the host computer 20 is connected to storage controller 12 by channels 34(a), 34(b), 34(c) and 34(d). Although four host computer systems and six direct storage devices are depicted in FIG. 1, the storage controller 12 can handle additional channels and direct access storage devices.

Figure 2:
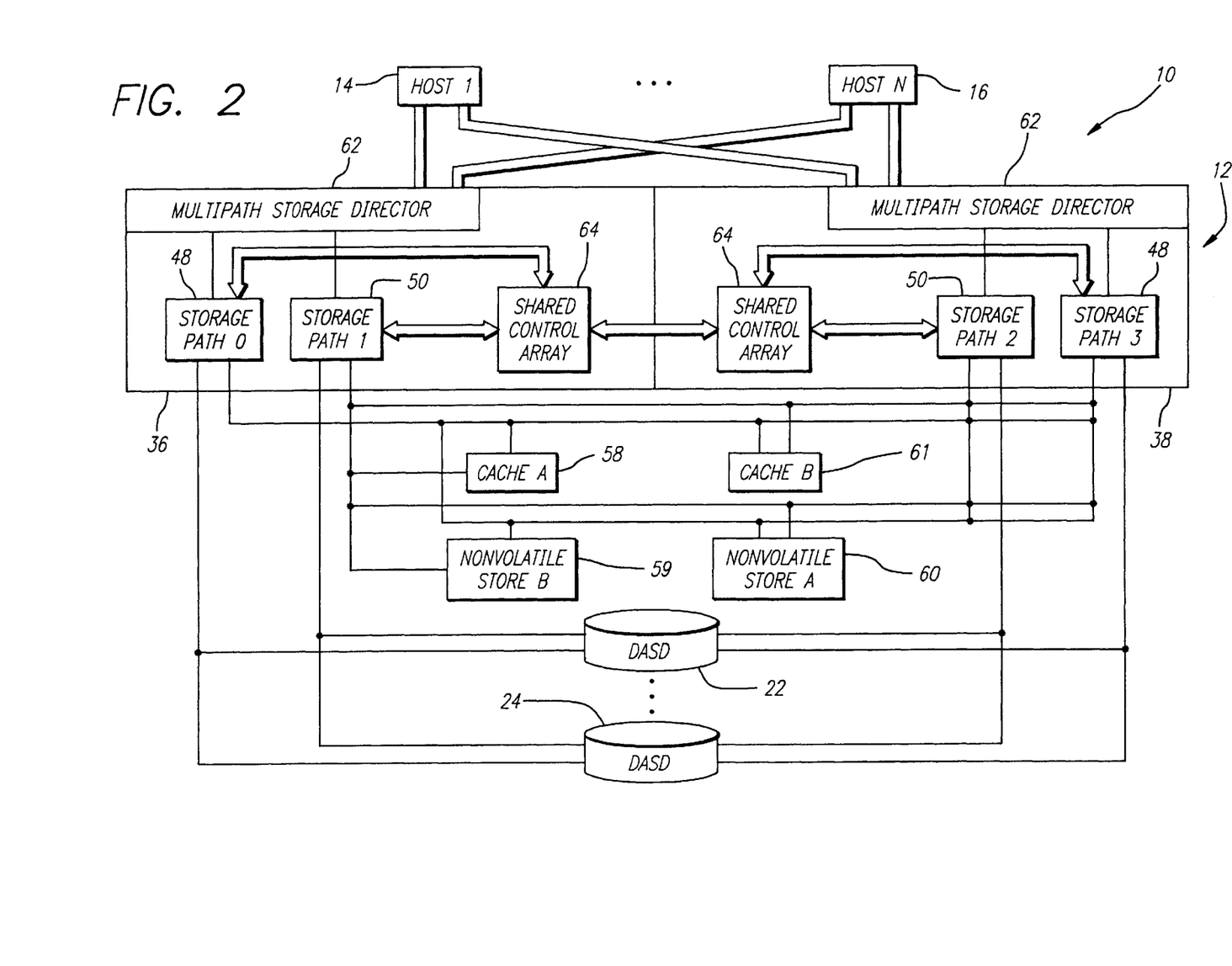
FIG. 2 depicts in more detail the storage controller of the data processing system of the present invention.

FIG. 2 depicts the storage controller 12 in greater detail. The storage controller 12 has two storage clusters 36 and 38, each of which provides for selective connection between a host computer and a direct access storage device. The clusters 36 and 38 are on separate power boundaries. Each cluster includes a first multipath storage director 62 with associated storage paths 48 and 50, a shared control array (SCA) 64. The shared control arrays 64 of each cluster are interconnected as is known in the art. First and second cache memories (Cache A) 58 and (Cache B) 61 respectively, and first and second nonvolatile memories (NVS B) 59 and (NVS A) 60, respectively are provided. Each storage path of each cluster is connected to each cache memory and each nonvolatile memory for optimum reconfigurability as discussed herein. Data written to Cache A 58 is backed up in cross-paired nonvolatile memory NVS A 60. Likewise, data written to Cache B 61 is backed up in cross-paired nonvolatile memory NVS B 59.

Figure 3:
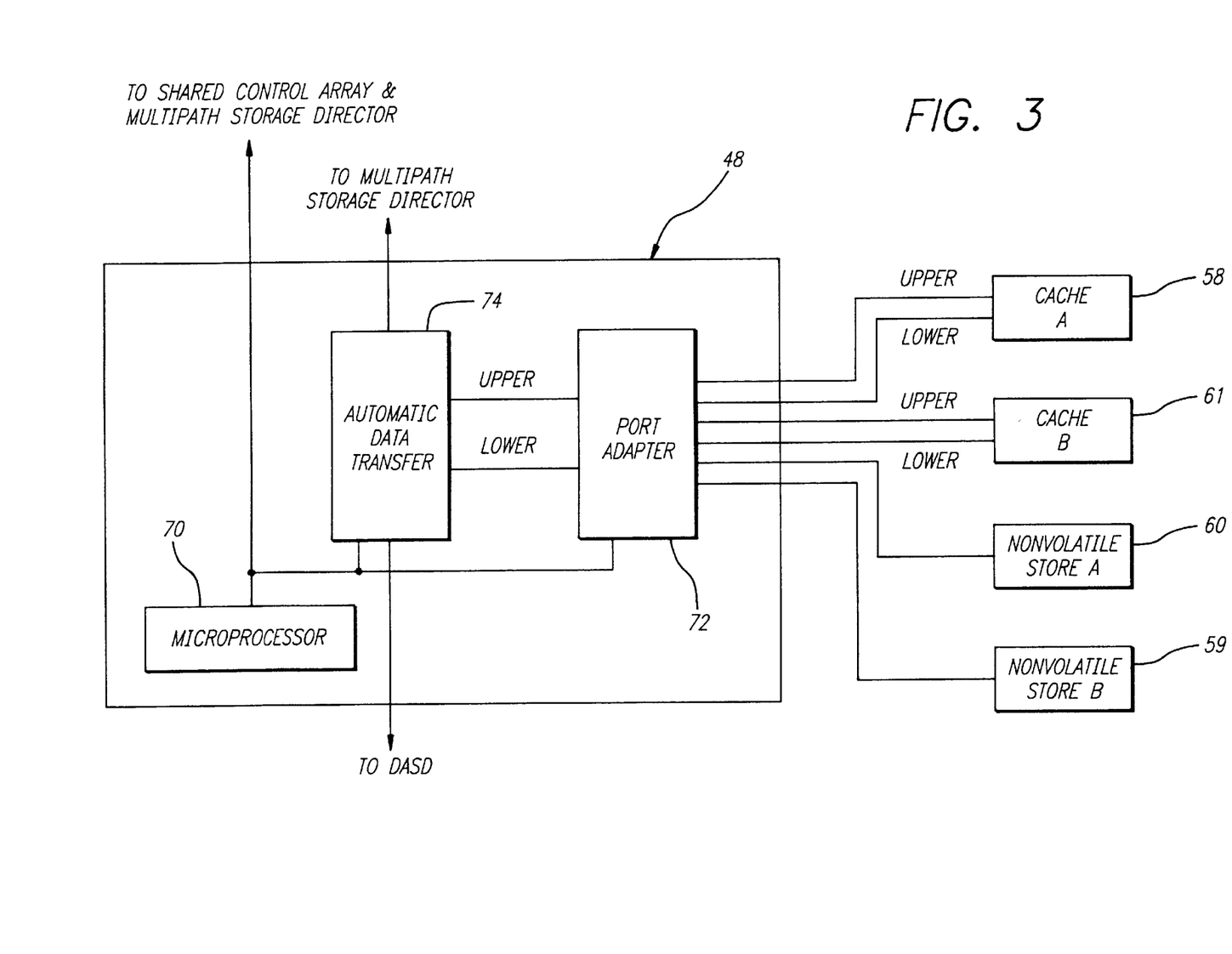
FIG. 3 is a block diagram of a storage path of the storage controller of the present invention.

FIG. 3 is a block diagram of a storage path. The storage path 48 is connected to a multipath storage director. Data transfer between the storage path 48 and one of the direct access storage devices during synchronous operations occurs via an automatic data transfer circuit 74. A port adapter 72 controls transfer of data between the cache memories 58 and 61, the nonvolatile memories 59 and 60 and DASD devices (not shown).

The cache and non-volatile memories provide for logical completion of certain data transfers without waiting for physical synchronization of disk and channel connection.

All operations of the storage path 48 are under control of a microprocessor 70. Processor control microcode is executed by the microprocessor in the storage path to control the operation of the storage controller. Hence, while each storage path is, in effect, a stand alone control unit based upon its own microprocessor, the storage paths share processor control information through the SCA 64 (shown in FIG. 2) for synchronization functions for handling connections, disconnections and reconnections relating to a transaction. Any scheme may be used to effect the connections and disconnections. U.S. patent application entitled USE OF CONFIGURATION REGISTERS TO CONTROL ACCESS TO MULTIPLE CACHES AND NONVOLATILE STORES, Ser. No. 07/992,368, filed Dec. 17, 1992, filed by B. C. Beardsley, et al., now abandoned in favor of continuation application Ser. No. 08/386,602, filed Feb. 10, 1995 the teachings of which are incorporated herein by reference, discloses a particularly advantageous technique for effecting the necessary connections and disconnections.

Figure 4:
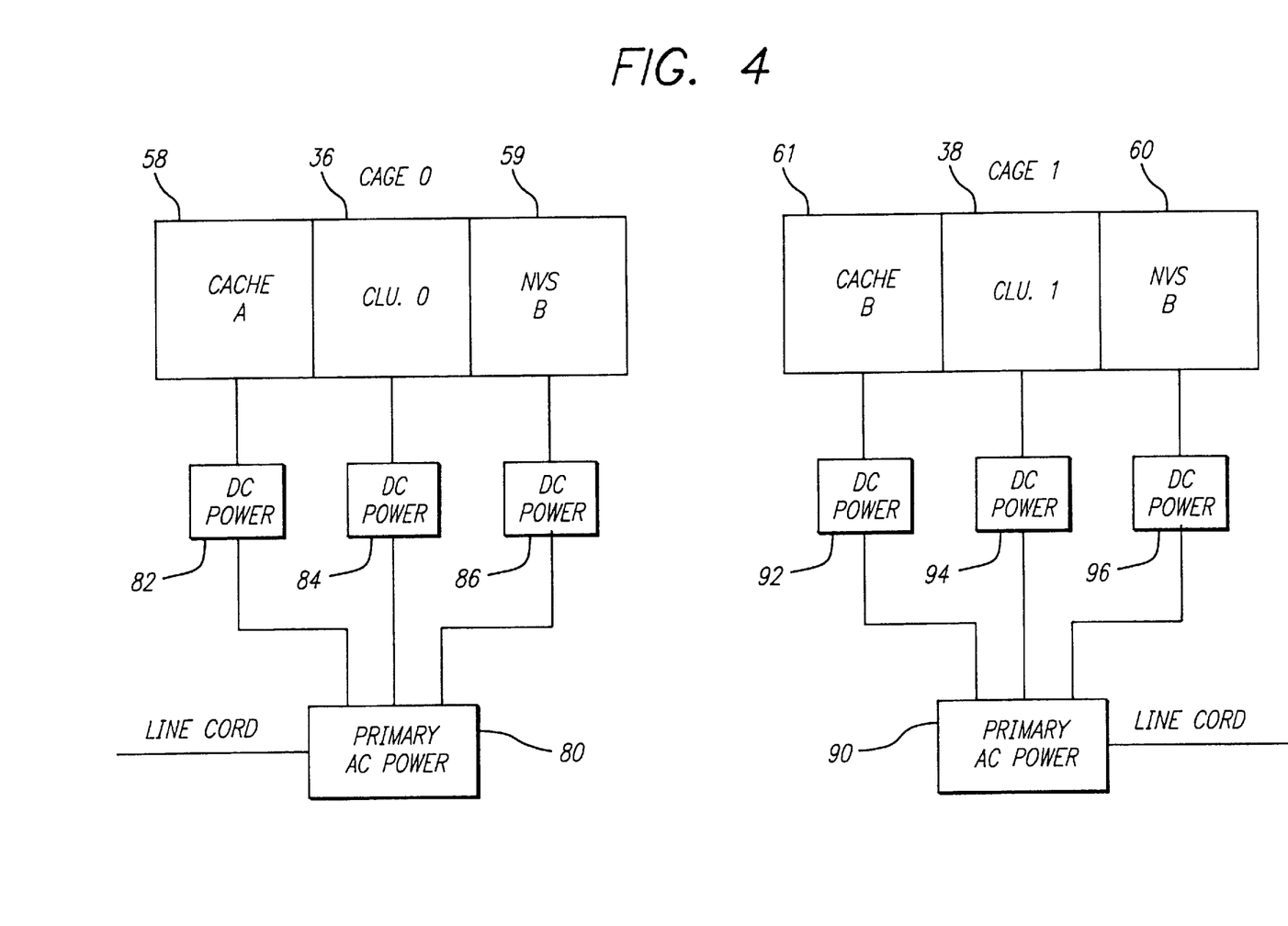
FIG. 4 is a block diagram illustrating the power management scheme of the storage controller of the present invention.

FIG. 4 is a block diagram illustrating the power management scheme of the storage controller. In each cluster, one of the cache memories and one of the nonvolatile memories are included within a separately powered cage. Thus, Cage 0 contains the first cluster 36, the first cache memory 58 and the first nonvolatile memory 59. Likewise, Cage 1 contains the second cluster 38, the second cache memory 61, and the second nonvolatile memory 60. Power is supplied to Cage 0 from wall power via a line cord and a conventional primary AC (alternating current) power supply 80. The primary AC power supply 80 supplies power to the first cache memory 58 via a first DC (direct current) power supply 82, to the first cluster 36 via a second DC power supply 84, and to the first nonvolatile store 59 through a third DC power supply 59.

The second cage (Cage 1) is powered via a second line cord and a second AC power supply 90. The second primary AC power supply 90 supplies power to the second cache memory 61 via a fourth DC power supply 92, to the second cluster 38 via a fifth DC power supply 94, and to the second nonvolatile memory 60 via a sixth DC power supply 96. As mentioned above, the cache memories and the associated backup memories are cross-paired on separate power boundaries. That is, Cache A is cross-paired with NVS A and Cache B is cross-paired with NVS B. In this arrangement, NVS A shadows Cache A. Likewise, Cache B is cross-paired with NVS B. Hence, a failure in power supplied to a cache will not necessarily mean that power will not be supplied to the associated nonvolatile backup memory.

In accordance with the present teachings, during initial microcode load (IML), code is input via a conventional support facility (not shown) as described more fully in the above-referenced patent application Ser. No. 07/992,368, now abandoned in favor of continuation application Ser. No. 08/386,602 incorporated herein by reference and entitled USE OF CONFIGURATION REGISTERS TO CONTROL ACCESS TO MULTIPLE CACHES AND NONVOLATILE STORES. The code is run by the microprocessors 70. On the detection of a failure of nonvolatile memory, the microprocessors destage data from the associated (cross-paired) cache memory to other cache memories in the system. The detection of a failure of nonvolatile memory may be achieved in accordance with several schemes: 1) a hardware signals check during a data transfer operation that uses storage; 2) power loss may be detected in the failed component; 3) a time out waiting for a transfer to end may occur and/or 4) by an error detecting code in software. In any event, in accordance with the present teachings, instead of suspending operation of the cache cross-paired with the failed NVS, the unit is allowed to continue to operate.

In a preferred illustrative embodiment, specific types of data are handled as discussed below and as shown in the simplified flow diagrams of FIGS. 5 and 6.

Figure 5:
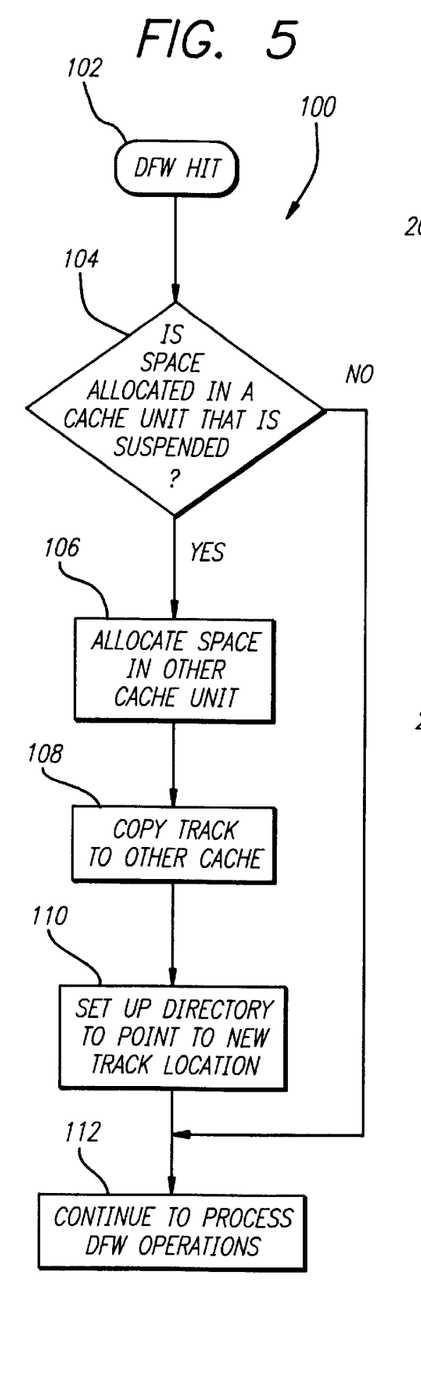
FIG. 5 is a flow diagram of the operation of the storage controller of the present invention when a DASD Fast Write to protected data in a cache cross-paired to a failed nonvolatile memory is requested.

FIG. 5 is a flow diagram of the operation of the storage controller of the present invention when a DASD Fast Write to protected data in a cache cross-paired to a failed nonvolatile memory is requested.

Figure 6:
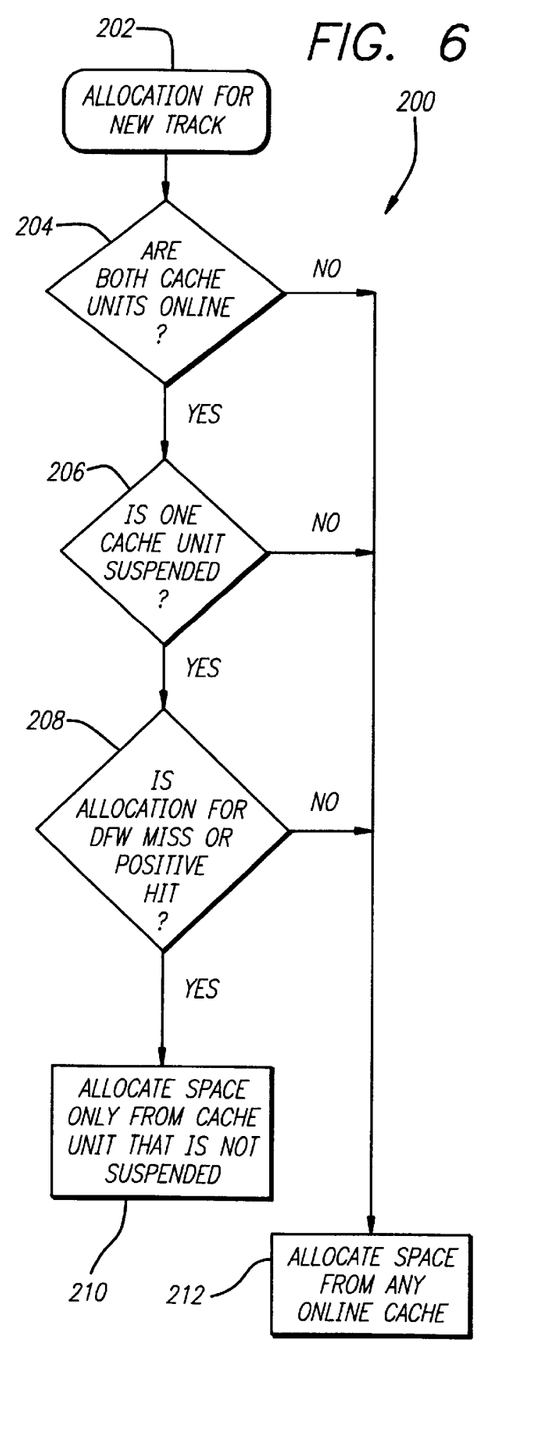
FIG. 6 is a flow diagram illustrating how the storage controller of the present invention may allocate data in cache storage.

FIG. 6 is a flow diagram illustrating how the storage controller of the present invention may allocate data in cache storage.

In accordance with the invention, if, for example, NVS A fails, the control microcode reconfigures the system and allows cross-paired Cache A to continue to operate. DASD Fast Write modified data is destaged (unloaded) from Cache A and NVS A is placed in a failed state. In the preferred embodiment, this is achieved in the manner disclosed in the above-referenced U.S. Pat. No. 5,437,022 entitled STORAGE CONTROLLER HAVING ADDITIONAL CACHE MEMORY AND A MEANS FOR RECOVERING FROM FAILURE AND RECONFIGURING A CONTROL UNIT THEREOF IN RESPONSE THERETO.

Figure 7:
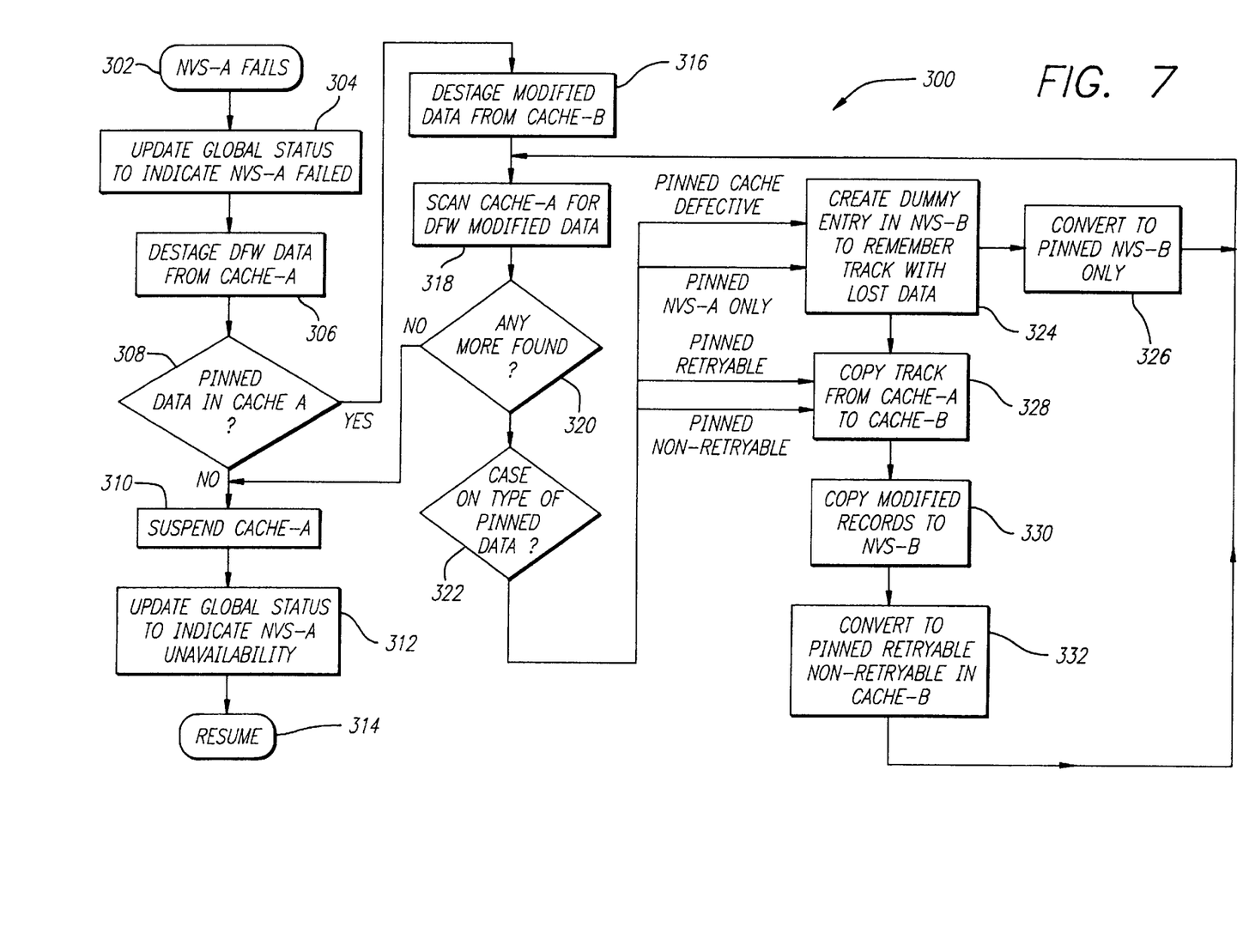
FIG. 7 is a flow diagram of an illustrative recovery and reconfiguration mode in the event of a failure of NVS A.

As illustrated in the flow diagram of FIG. 7, Global Status is updated to indicate that NVS A failed. A scan of the directory is initiated to locate and destage all DFW modified tracks in Cache A. Any pinned tracks are handled. The term 'pinned data' is used in the art to refer to modified data in cache or NVS that can not be written to the DASD. If all pinned data have been moved in Cache/NVS B, then: 1) Global Status is updated to show that NVS A is unavailable (this indicates that NVS A has no data of interest to the subsystem) and 2) Cache A is placed in a suspended state.

Next, the following rules are adhered to for allocation of data in cache storage.

1. Cache Fast Write (CFW) data and Concurrent Copy Sidefiles may be allocated in either Cache A or Cache B. (CFW refers to a cache fast write operation in which data to be written to the storage device is written to cache and not backed up in nonvolatile memory. Concurrent Copy files are files generated during concurrent copy operations. Concurrent Copy involves a designation and preservation of data for later backup to a storage device.)

2. DASD Fast Write Predictable Writes (format writes that adhere to specific guidelines) must be allocated in Cache B. This allows the advantage of DASD Fast Write.

3. Read Misses whose file masks include Inhibit Write will be allocated in Cache A. (A Read Miss is an I/O chain that attempts to read data. When the data is not in cache, a Read Miss occurs.) A file mask indicating inhibit write is a good indicator that this data set will be read-only and less likely to receive a DASD Fast Write request. (A file mask is a byte in a command that is prefixed to every input/output (I/O) chain by the operating system to define to the storage controller what limitations are to be placed on the execution of the I/O chain. The authorization to write is contained in the file mask byte of the command. If the file mask prohibits writes, then the storage control unit knows that (at least for this I/O chain, no modified data will be placed in cache for this track.

4. Read Misses whose file masks do not include Inhibit Write will be allocated in Cache B.

5. Tracks that are already in cache but require additional segments (partial tracks or tracks that are to be reformatted) must allocate their additional segments in the same cache as the original segments.

6. DASD Fast Write Misses will be allocated in Cache B to take advantage of DASD Fast Write Performance on subsequent writes.

With these allocation rules, performance degradation due to NVS failure is minimized except in the case of DASD Fast Write Update Write hits. This case occurs when a track exists in Cache A and a DFW Update Write request comes to that track. Since Cache A has no shadowing NVS, it cannot perform the DASD Fast Write. Executing the write on the drive is much slower than DASD Fast Write to the NVS.

In order to resolve the Update Write problem, the storage control unit 12 is coded to present a Channel Command Retry (CCR) signal to channels 32a, 32b, 32c or 32d and disconnect from the channel when it receives a DFW Update Write to a track that is in Cache A. The microcode will then invoke an asynchronous task to allocate space in Cache B, transfer the track data from Cache A to Cache B, and deallocate the space in Cache A. When this is complete, the storage control unit 12 will request reconnection to the channel and the Update Write will proceed via DASD Fast Write to Cache B and NVS B.

By doing the cache to cache transfer and then the DASD Fast Write to Cache B and NVS B, the overhead associated with selecting the drive, moving the drive arm and positioning it to the proper sector on the drive is avoided. In addition, the higher data rate of the DASD Fast Write operation is utilized.

Thus, the present invention has been described herein with reference to a particular embodiment for a particular application. Those skilled in the art with access to the present teachings will be able to design microcode to implement the invention in a manner suitable for a given application. In addition, those having ordinary skill in the art and access to the present teachings will recognize additional modifications applications and embodiments within the scope thereof. For example, the invention is not limited to reconfiguration and recovery scenarios disclosed. Additional reconfiguration and failure recovery options are made possible by the present invention.

It is therefore intended by the appended claims to cover any and all such applications, modifications and embodiments within the scope of the present invention.

Accordingly,
What is claimed is:

1. A storage controller comprising:
   first cluster means for directing data to be stored from a host computer to a direct access storage device;
   second cluster means for directing data to be stored from a host computer to a direct access storage device;
   a first cache memory connected to said first cluster means;
   a second cache memory connected to said second cluster means;
   a first nonvolatile memory connected to said first cluster means;
   a second nonvolatile memory connected to said second cluster means;
   means for directing data to be stored to said first cache memory and backing up that data in said second nonvolatile memory in a first operational mode;
   means for recovering data from said first cache memory in the event of a failure of said second nonvolatile memory, including means for directing the recovered data to said second cache memory and backing up said recovered data in said first nonvolatile memory in a second operational mode; and
   means for allocating the data to be stored between said first cache memory and said second cache memory in the event of the failure of said second nonvolatile memory.

2. The storage controller of claim 1 wherein said first cache memory and said second cache memory are on separate power boundaries.

3. The storage controller of claim 2 wherein said first and second nonvolatile memories are on separate power boundaries.

4. In a storage controller having first and second clusters for directing data to be stored from a host computer to a direct access storage device, a first cache memory connected to said first cluster, a first nonvolatile memory connected to said first cluster, an improvement wherein said improvement comprises:
   a second cache memory connected to said second cluster;
   a second nonvolatile memory connected to said second cluster;
   means for directing data to be stored to said first cache memory and backing up that data in said second nonvolatile memory in a first operational mode;
   means for recovering data from said first cache memory in the event of a failure of said second nonvolatile memory, including means for directing the recovered data to said second cache memory and backing up said recovered data in said first nonvolatile memory in a second operational mode; and
   means for allocating the data to be stored between said first cache memory and said second cache memory in the event of the failure of said second nonvolatile memory.

5. The improvement of claim 4 wherein said first cache memory and said second cache memory are on separate power boundaries.

6. The improvement of claim 5 wherein said first and second nonvolatile memories are on separate power boundaries.

7. A method for storing data including the steps of:
   providing a first cluster for directing data to be stored from a host computer to a direct access storage device;
   providing a second cluster for directing data to be stored from a host computer to a direct access storage device;
   providing a first cache memory connected to said first cluster;
   providing a second cache memory connected to said second cluster;
   providing a first nonvolatile memory connected to said first cluster;
   providing a second nonvolatile memory connected to said second cluster;
   directing data to be stored to said first cache memory and backing up that data in said second nonvolatile memory in a first operational mode; and
   recovering data from said first cache memory in the event of a failure of said second nonvolatile memory;
   directing the recovered data to said second cache memory and backing up said recovered data in said first nonvolatile memory in a second operational mode; and
   allocating the data to be stored between said first cache memory and said second cache memory in the event of the failure of said second nonvolatile memory.

8. The method of claim 7 wherein said first cache memory and said second cache memory are on separate power boundaries.

9. The method of claim 8 wherein said first and second nonvolatile memories are on separate power boundaries.

* * * * *